United States Patent [19]

Muhr

[11] 4,154,422
[45] May 15, 1979

[54] ADJUSTABLE AND AUTOMATICALLY LOCKING MOTOR-VEHICLE SEAT MOUNTING ASSEMBLY

[75] Inventor: Dieter Muhr, Remscheid-Hasten, Fed. Rep. of Germany

[73] Assignee: Keiper Automobiltechnik GmbH & Co KG, Remscheid-Hasten, Fed. Rep. of Germany

[21] Appl. No.: 863,141

[22] Filed: Dec. 21, 1977

[30] Foreign Application Priority Data

Dec. 29, 1976 [DE] Fed. Rep. of Germany ....... 2659311

[51] Int. Cl.² .......................................... F16M 13/00
[52] U.S. Cl. ................................... 248/429; 297/216
[58] Field of Search ................. 248/429, 430; 297/216

[56] References Cited
U.S. PATENT DOCUMENTS

| | | | |
|---|---|---|---|
| 2,292,718 | 8/1942 | Ryerson | 248/430 |
| 2,951,527 | 9/1960 | Wassilieff | 248/430 X |
| 3,189,313 | 6/1965 | Burns et al. | 248/429 |
| 3,853,298 | 12/1974 | Libkie et al. | 248/429 |
| 3,926,396 | 12/1975 | Hall et al. | 248/418 |

*Primary Examiner*—Lawrence J. Staab
*Attorney, Agent, or Firm*—Michael J. Striker

[57] ABSTRACT

A motor-vehicle seat is carried on at least one slide displaceable along a guide rail having an upper edge formed with a plurality of upwardly open notches. Inside this guide rail is an adjustment member which is vertically displaceable so as frictionally to engage the guide rail and arrest the slide relative to the seat. Furthermore a safety member is provided which is also carried on the slide and which is displaceable toward and away from the notches formed in the upper edge of the guide rail. Respective springs urge the adjustment and safety members into the positions locking the slide and rail relative to each other. A common handle is actuatable to pull the adjustment member out of engagement with the rail and to pull the safety member also out of engagement with the notches of the rail. Thus in case of a collision even if the frictional engagement of the adjustment member with the rail is insufficient to lock the seat in position, the engagement of the safety member with the notches will suffice.

13 Claims, 5 Drawing Figures

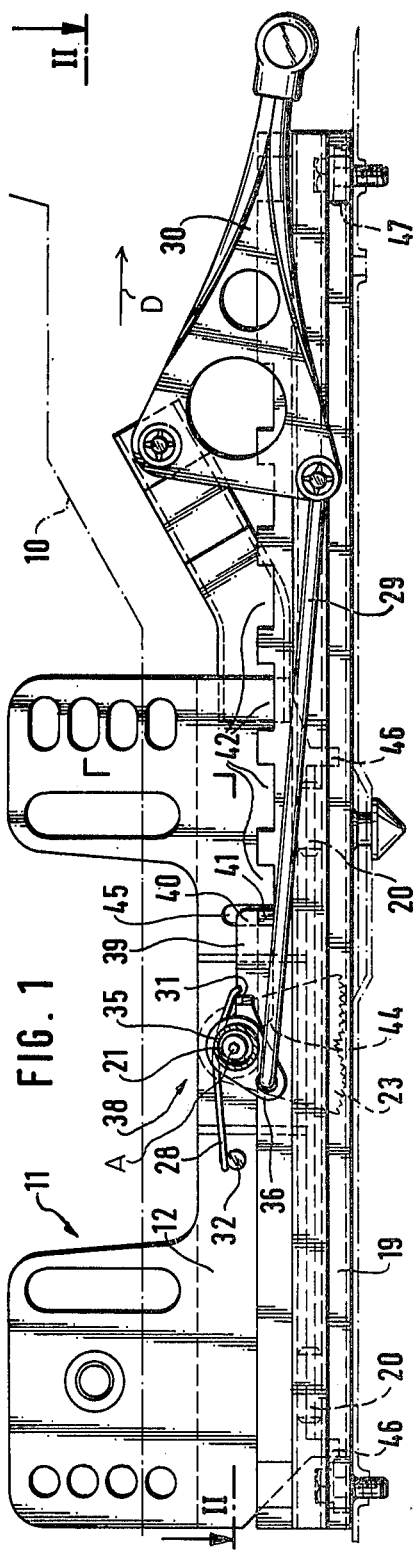
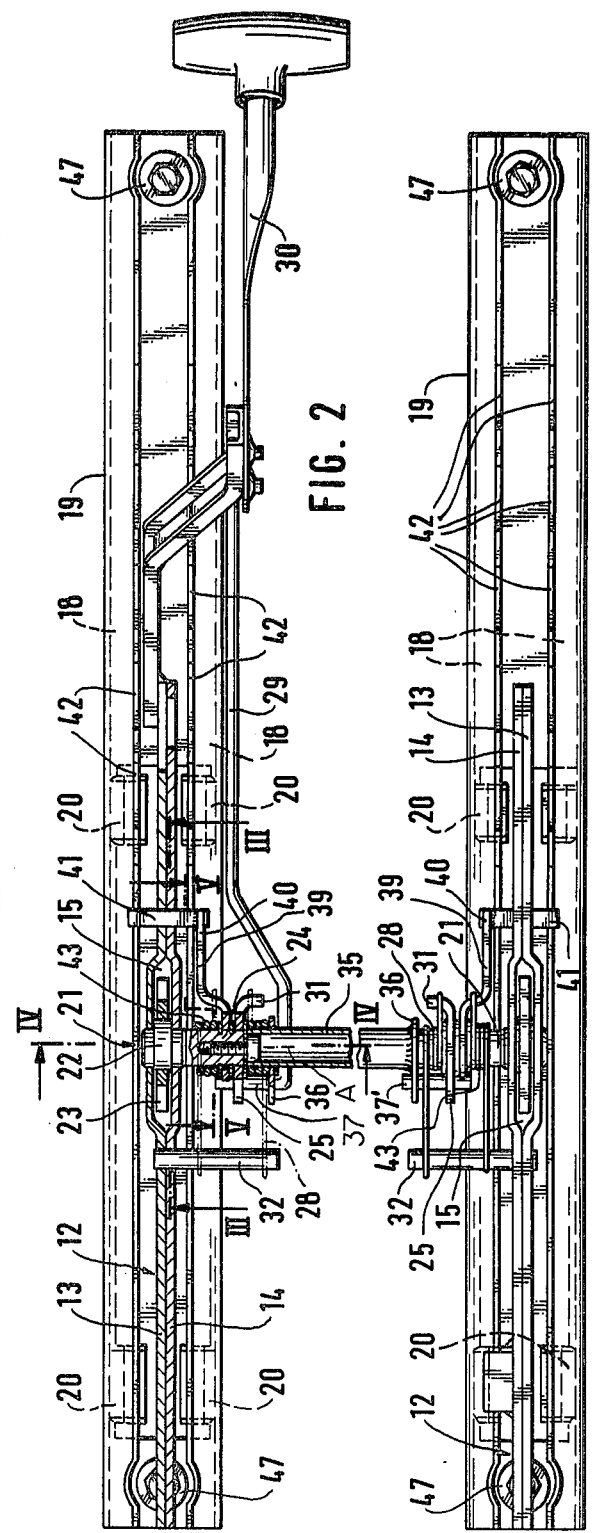

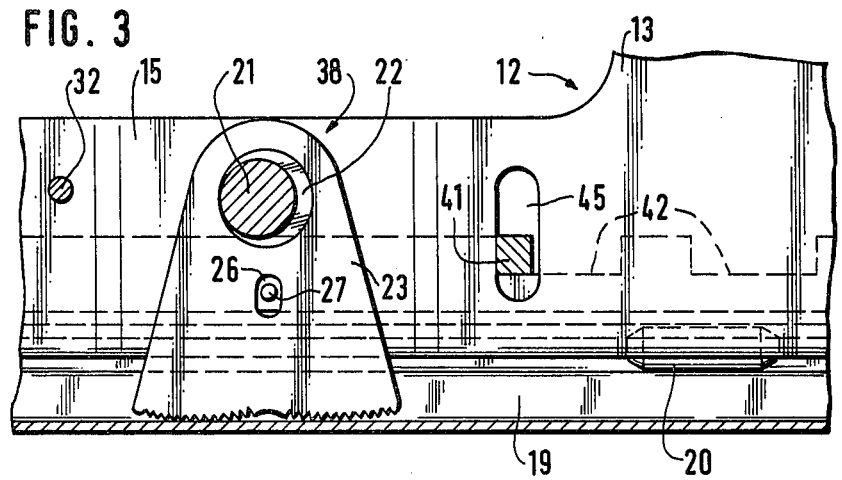
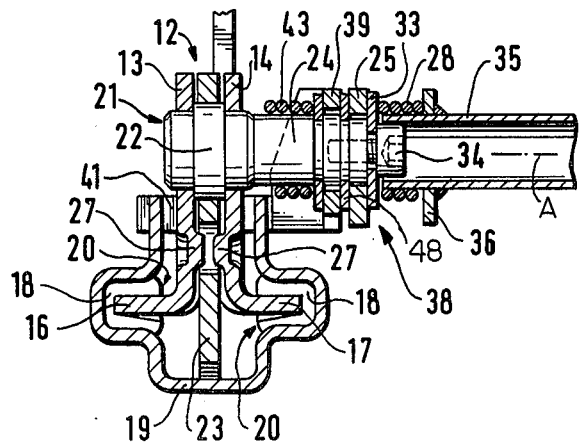
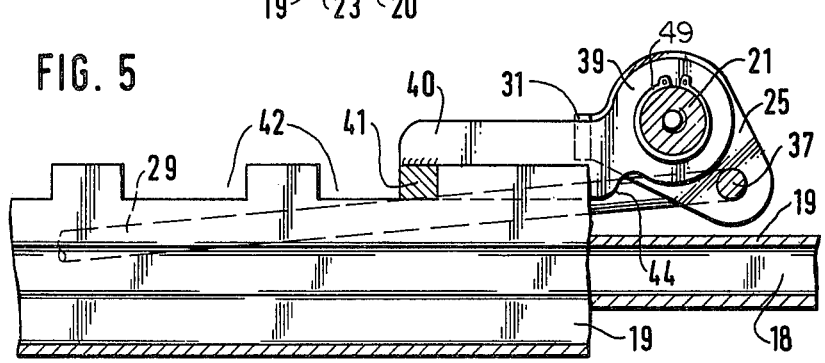

ADJUSTABLE AND AUTOMATICALLY LOCKING MOTOR-VEHICLE SEAT MOUNTING ASSEMBLY

BACKGROUND OF THE INVENTION

The present invention relates to a mounting assembly for a motor-vehicle seat. More particularly this invention concerns such an assembly which allows the seat to be locked in any of a plurality of positions spaced apart in the direction of travel of the vehicle.

At least the driver's seat of a motor vehicle is normally mounted in such a manner that it can be secured in any of a plurality of positions spaced along the direction of travel of the vehicle. This adjustment allows the seat to be moved closer to the steering wheel and pedals for a short driver and farther away for a tall driver.

To this end the seat is normally carried on a pair of slides each movable along a respective floor-mounted guide rail. An adjustment member carried on each slide is displaceable into and out of engagement with any of a plurality of position-defining recesses on the respective floor-mounted guide. A handle can lift these adjustment members out of the recesses in which they are engaged to allow the person sitting on the seat to move it forwardly or backwardly. Thereafter the handle is released to allow engagement of the adjustment members into the nearest recesses.

It is essential in such arrangements, however, that the mounting assembly be capable of holding the seat and preventing it from sliding even when considerable forces are exerted between the seat and the support. Thus, for instance, it is necessary that the seat not slip if the vehicle is sharply accelerated or decelerated.

One arrangement is known wherein each of the supports is provided with a detent formed as a row of sawteeth. The relatively sharply inclined flanks of the one detent are in front of the relatively flatly inclined flanks of the same detent on one side and in the opposite side this arrangement is reversed. The adjustment members are each engageable in the respective row of teeth. In addition a so-called safety member is provided which extends above these teeth and which normally is held by a relatively weak leaf spring out of engagement from these teeth. This safety member can, however, be displaced into engagement with the teeth in such a manner as rigidly to lock the slide and support together, even in a relatively violent collision.

In this arrangement the safety members are so weighted and dimensioned that whenever a horizontal force above a predetermined relatively low limit is effective on them, as for instance during rapid acceleration or deceleration, they inertially swing into engagement with the respective detents and lock the seat. Thus the necessary function of preventing the seat from sliding during a rapid acceleration or deceleration is attained.

Such an arrangement has, however, the considerable difficulty that it is necessary to dimension the leaf spring that holds the safety members in their unengageable positions very exactly. If the spring is too strong the safety mechanism will not respond; if too weak the seat will be locked and adjustment will be impossible at any time. Similarly once such an arrangement is actuated it frequently becomes very difficult to unlock the seat. A final difficulty with this arrangement is that it is relatively complex and expensive to manufacture, while at the same time only allowing the seat to be locked in any of a plurality of predetermined positions.

SUMMARY OF THE INVENTION

It is therefore an object of the present invention to provide an improved seat-mounting assembly.

Another object of this invention is the provision of such an assembly which does not suffer from the above-given disadvantages of the prior-art assemblies.

A further object is to provide a seat-mounting assembly which allows the seat to be arrested at any desired location along its support.

These objects are attained according to the present invention by biasing both the adjustment member and the safety member via adjustment and safety springs into their locking positions in which the adjustment member prevents displacement of the slide relative to the support and in which the safety member is engageable in one of the recesses of the detent of the arrangement.

With such an arrangement it is therefore possible to control the adjustment member and the safety member with the same handle. Furthermore it is possible to use a purely frictionally operating adjustment member so as to allow the seat to be locked at any desired position along the support rail for it. Of course this means that the safety member will not necessarily be engaged in one of the recesses, however since it is biased against the detent only modest displacement is necessary for it to fall into one of the recesses and lock the seat. Thus in case of a collision it is possible for the seat to slip a very small amount before being rigidly locked in place by the safety member.

According to further features of this invention the support is formed as a cruciform-section hollow guide rail extending in the direction of travel of the motor vehicle and having an upper open side defined between a pair of edges. The slide is formed of a pair of L-section bars which are secured together at their vertical flanges and which have horizontal flanges engaging in the longitudinally extending grooves of the guide rail, so that this slide is of T-section. The vertical flanges are bent apart at a predetermined location along the slide and the adjustment member is journalled on a shaft between these two L-section bars at this location where they are bent apart.

According to yet further features of this invention the adjustment member is constituted as a rigid foot only vertically displaceable between the L-section bars of the slide and carried on an eccentric portion of a shaft journalled in the vertical flanges of both of these bars so that rotation of this shaft vertically displaces the foot and can bring it to bear with considerable force on the support rail. Obviously such frictional engagement can be made effective anywhere along the support rail for stepless adjustment of the seat. The shaft is itself provided with an extending arm in which is hooked one end of a tierod whose other end is connected to a lever pivoted on the support, so that lifting of the end of the lever automatically pivots the shaft in such a direction as to pull it away from the support rail and allow sliding of the seat.

The safety member according to this invention is constituted as yet another pawl loosely pivoted on the above-mentioned shaft and having an end extending horizontally perpendicular to the adjustment direction of the assembly. The two upper edges of the guide rail are each formed with a respective row of the safety recesses, and the end of this pawl engages also through a hole in the L-section bars constituting the slide rail.

The pivoting of the pawl is so loose on the shaft of the adjustment member that force transmission between the slide and the support is not effective on the shaft at all, but is effective merely by bracing of the end of the pawl in one direction on the side of the hole in the slide through which it passes and in the other direction on the side of the recesses in the guide rail in which it is engaged. Thus the safety member is capable of withstanding enormous forces without any permanent damage or effect on the mechanism.

According to further features of this invention two such assemblies are provided for mounting the seat in the motor vehicle. Only one handle is, however, needed, as the two assemblies are connected together by means of a horizontally extending tubular link. This tubular link is provided at each end with a radially extending arm and is mounted on the ends of the shaft of the mechanisms. A tierod connected at one end to the operating handle has a bent over end which extends through a hole in one of these radially extending arms and also through another hole in another radially extending arm rotationally fixed to one of the shafts. The other end of the tubular link is connected to a similar radially extending arm on the other shaft by means of a pin which serves merely to rotationally link together the other end of the tubular link and the other shaft.

In accordance with yet another feature of this invention the handle is displaceable through an intermediate position between its actuated and unactuated positions. When displaced from the unactuated to the intermediate position the handle first moves the adjustment member out of frictional engagement with the support, and will move from the intermediate to the fully actuated position then displaces the safety member into the freeing position. This effect is achieved by forming the adjustment member as a pawl connected to the shaft of the adjustment member with an abutment surface that is engaged by the bent-over end of the tierod connected to the handle only after some angular displacement of the shaft of the adjustment member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of the assembly according to this invention;

FIG. 2 is a section taken along line II—II of FIG. 1; and

FIGS. 3, 4 and 5 are sections taken along lines III—III, IV—IV and V—V of FIG. 2, respectively.

DESCRIPTION OF THE PREFERRED EMBODIMENTS

As shown in FIGS. 1-5 a motor-vehicle seat 10 is carried on a slide 11 constituted by a pair of plates 12 each in turn formed by a pair of L-section angles 13 and 14 extending in the normal direction of travel D of the motor vehicle. The vertical flanges of the two angle members 13 and 14 are bent apart to form a space 15 at a central region.

Each of the bars or plates 12 is slidable in a respective cruciform-section guide rail 19 having a pair of inwardly open grooves 18 receiving the horizontal flanges 16 and 17 of the respective bar 12. At their ends the flanges 16 and 17 are provided with synthetic-resin slide blocks 20 that allow easy sliding of the bars 12 inside the rails 19 in the direction D.

The mechanisms on each side of the seat 10 are virtually identical so that hereinafter only one of the assemblies will be described. Any structure in one assembly different from that of another will be mentioned in detail.

Journalled in the vertical flanges of the two L-section elements 13 and 14 is a shaft 21 centered on an axis A and having a central large-diameter eccentric portion 21 centered on an axis slightly offset from the axis A. An adjustment member 23 is journalled on the eccentric portion 22 so that as the shaft 21 is rotated about the axis A this adjustment member or foot 23 will be vertically displaced toward and away from the bottom surface of the upwardly open guide rail 19. In order to maximize friction between the member 23 and the guide rail 19 the lower surface of the member 23 is formed with a pair of adjacent arcuate arrays of ridges extending horizontally and perpendicular to the direction D. These elements 21-23 constitute an adjustment mechanism 38.

Carried on an axial extension 24 of the shaft 21 is a radially extending lever or pawl 25 which is rotationally coupled to the shaft 21 by being tightly axially clamped between a snap ring 48 and a washer 33, the latter being held on the end of the extension 24 by an Allen screw 34. This lever or arm 24 serves to rotate the shaft 21 and vertically displaces the foot 23. Furthermore this foot 23 is formed with a throughgoing vertically elongated slot 26 in which engages a pair of pin-like bosses 27 formed in the vertical flanges of the L-section elements 13 and 14. Thus the adjustment member 23 can only be displaced vertically as the shaft 21 is rotated by means of the arm 25.

A torsion spring 28 has as shown in FIG. 1 one end hooked over a tab 31 on the lever 25 and another end engaging a pin 32 screwed into the slide 11.

A connecting or tierod 29 extending generally in the direction D has a front end pivoted in a lever 30 pivoted also on the support 19, and a rear end 37 which is bent over and engages through a hole in the lever 25 as shown in FIG. 2.

A connecting tube 35 is loosely fitted over the two cap screws 34 of the two adjustment mechanisms 38 and has at each end a respective radially extending arm 36. The bent-over end 37 of the rod 30 extends at one of the mechanisms through a hole in this arm 36 and through the above-mentioned hole in the arm 25. On the other end of the tube 35 a short pin 37' is provided for angularly linking together the two arms 36 and 25. Of course the handle 30 could be provided on either side of the assembly, but is normally provided on the front right side of the motor-vehicle seat.

Loosely received on the extension 24 is also a pawl 39 axially engaged between the snap ring 48 and another snap ring 49. This pawl 39 has an arm 40 at the end of which is welded a horizontally extending bar 41 which can be vertically engaged in any of a plurality of upwardly open rectangular-section notches 42 formed in the two sides of the upper edges of the rail 19. A torsion spring 43 has one end hooked as shown in FIG. 2 over the offset portion of the arm 39 and another end engaging the pin 32. Furthermore this safety member 39 has a radially extending tab forming an abutment portion 44 engageable with the bent-over end 37 of the rod 29 after angular displacement from the position in FIG. 5 through about 90°. The bar 41 carried on the end of the arm 40 engages through a pair of transversely registering vertical slots 45 in the sides of the guide rail 19. There is more radial play between the shaft 21 and the member 39 than there is play between the bar 41 and the slot 45.

The slides 11 are provided at each end with downwardly extending tabs 46 engageable with mounting screws 47 that secure the rails 19 in the motor vehicle. Thus these screws 47 define the end positions for the slides 11.

Under normal circumstances the various parts of the above-described mechanism normally lie in the indicated positions of FIGS. 1-5. The handle 30 has its graspable end relatively close to the floor of the motor vehicle. The spring 28 angularly urges the shaft 21 in the direction to press the lower edges of the foot 23 tightly against the bottom of the rail 19, an effect which is enhanced by the fact that the weight of the handle 30 is effective in this direction to act with the spring force. At the same time the spring 43 is effective to press the bar 41 down against the top of the rail 19, either into one of the notches 42 or onto one of the raised portions between these notches 42, the latter raised portions being substantially shorter in the direction D than the notches 42.

When the handle 30 is lifted from the illustrated unactuated position it first rotates the shaft 21 about the axes A so as first of all to bring the ridges on the lower edges of the seat 23 out of engagement with the rail 19. After movement through some angular distance the end 37 engages the abutment surface 44 and lifts the bar 41 up out of engagement with the rail 19. In this position the seat 10 can be moved forwardly or backwardly in the direction D.

Once the desired position of the seat 10 is attained the handle 30 need merely be reduced so that it falls both under the force of its own weight and of the springs 28 and 43 back to the position illustrated in FIG. 1. This automatically allows the bar 41 to drop back onto the top of the rail 19 and presses the foot 23 against the rail 19 also.

In case of an accident the frictional force with which the foot 23 engages the rail 19 is frequently insufficient to prevent the seat 10 from moving relative to the rail 19. The interengagement of the bar 41 in the notches 42 is, however, more than sufficient to completely arrest the seat 10. This interengagement is effective between the slots 45 and the notches 42, so that no strain is placed on the shaft 21 in this instant. Furthermore even if the bar 41 is resting on one of the raised portions between two notches 42, limited displacement in the direction D will align this bar 41 with two of the transversely registering notches 42 so that it will fall thereinto and thereafter lock the seat. Thus it is possible that in a sudden acceleration or deceleration very limited displacement in the direction D is possible, but after such limited displacement further displacement is absolutely out of the question.

The torsion springs 28 and 43 could be replaced by tension or compression springs simply by forming the levers 25 or 39 as two-armed levers. In addition the mechanism 38 could be built in another fashion if desired without departing from the scope of the invention. It would, for instance, be possible to use a pair of beams which are displaced by means of a cam into tight engagement with the side walls of the guide rail. It would also be possible to form the notches 42 on a detent which is completely separate from the rail 19.

It will be understood that each of the elements described above, or two or more together, may also find a useful application in other types of mechanisms differing from the types described above.

While the invention has been illustrated and described as embodied in a seat-mounting assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An assembly for mounting a motor-vehicle seat, said assembly comprising:
   a support;
   a slide displaceable in a predetermined direction along said support and carrying said seat;
   an adjustment member mounted on said slide and only frictionally engageable with said support in any relative position of said slide on said support;
   adjustment means connected to said adjustment member for displacing same between a locking position preventing displacement of said slide relative to said support in said direction and a freeing position permitting such displacement;
   a detent fixed on said support and having a plurality of recesses spaced apart in said direction;
   a safety member on said slide and engageable in said recesses;
   safety means connected to said safety member for displacing same between a locking position engageable in a one of said recesses and preventing relative displacement of said slide and said support and a freeing position unengageable in a one of said recesses;
   a safety spring connected between said slide and said safety member and biasing same into the respective locking position; and
   a single operating handle connected to both of said means and displaceable between an actuated position corresponding to said locking positions and an unactuated position corresponding to said freeing positions.

2. The assembly defined in claim 1, wherein said adjustment means includes a shaft rotatable on said slide about an axis transverse to said support and having an eccentric portion on which is journalled said adjustment member, said shaft being connected to said handle and said portion being dimensioned in such a manner that in one angular position of said shaft said adjustment member bears tightly on said support and in another angular position said adjustment member is out of contact with said support.

3. The assembly defined in claim 2; further comprising a second such support, adjustment member, adjustment means, adjusting spring, detent, safety member, safety means, and safety spring adjacent the first-mentioned support, adjustment member, adjustment means, adjustment spring, detent, safety member, safety means, and safety spring, and means interconnecting the shafts of said first and second adjustment means for joint pivoting and operation of same.

4. The assembly defined in claim 2, wherein said safety member is carried on said shaft and has an end engageable in said recesses, said assembly further comprising link means interconnecting said adjustment member and said safety member for generally joint displacement between their locking and freeing positions.

5. The assembly defined in claim 4; further comprising a tierod having one end connected to said handle and another end extending generally parallel to said shaft, engageable with both of said members, and constituting said link means.

6. The assembly defined in claim 5, wherein said support is a cruciform-section hollow rail extending in said direction and formed with a pair of inwardly open grooves extending in said direction, said slide being at least partially of T-section and having a pair of ribs each engaging in a respective one of said grooves.

7. The assembly defined in claim 6, wherein said slide is formed of a pair of L-section bars each having a horizontal flange constituting a respective rib and a vertical flange joined to the vertical flange of the other bar, said vertical flanges being bent apart at a predetermined location, said shaft being journalled in said vertical flanges at said location and said adjustment member being received between said flanges at said location.

8. The assembly defined in claim 7, wherein said adjustment member has a vertically elongated throughgoing slot, said vertical flanges being provided with a pin formation extending into said slot and preventing said adjustment member from pivoting horizontally relative to said shaft.

9. The assembly defined in claim 6, wherein each of said safety members is formed with an abutment surface spaced from said shaft, said handle being displaceable through an intermediate position between said actuated and unactuated positions, said tierod being engaged in said adjustment member and said end of said tierod being engageable with said abutment surface only when said handle is between and in said intermediate and actuated positions, whereby said safety member is operated after said adjustment member on displacement of said handle from said unactuated into said actuated positions.

10. The assembly defined in claim 6, wherein said springs are torsion springs on said shaft.

11. The assembly defined in claim 6, wherein said adjustment element has a ridged edge surface engageable with said rail.

12. The assembly defined in claim 6, wherein said handle is pivoted on said support at a pivot axis and is connected at a location offset from said pivot axis with said tierod.

13. The assembly defined in claim 6, wherein said rail has an upper edge constituting said detent and formed with said recesses.

* * * * *